(12) United States Patent
Mubarek et al.

(10) Patent No.: US 10,713,943 B1
(45) Date of Patent: Jul. 14, 2020

(54) METHOD AND APPARATUS FOR DETECTING A VEHICLE PARKING, STOPPING, OR STANDING LOCATION

(71) Applicant: HERE GLOBAL B.V., Eindhoven (NL)

(72) Inventors: Omer Mubarek, Chicago, IL (US); Colin Watts-Fitzgerald, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/414,486

(22) Filed: May 16, 2019

(51) Int. Cl.
*G08G 1/123* (2006.01)
*G08G 1/14* (2006.01)
*G08G 1/01* (2006.01)
*G07C 5/00* (2006.01)
*G01C 21/36* (2006.01)

(52) U.S. Cl.
CPC ........... *G08G 1/14* (2013.01); *G01C 21/3697* (2013.01); *G07C 5/008* (2013.01); *G08G 1/0112* (2013.01)

(58) Field of Classification Search
CPC ........ G08G 1/14; G08G 1/146; G08G 1/0133; G08G 1/012; G01C 21/28; G06F 17/30
See application file for complete search history.

(56) References Cited

U.S. PATENT DOCUMENTS

| 2009/0138497 | A1* | 5/2009 | Zavoli ................... G09B 29/106 |
| 2018/0121483 | A1* | 5/2018 | Giurgiu ................... G01C 21/32 |

* cited by examiner

*Primary Examiner* — Toan N Pham
(74) *Attorney, Agent, or Firm* — Ditthavong & Steiner, P.C.

(57) ABSTRACT

An approach is provided for automatic detection of vehicle parking, stopping, and/or standing locations (e.g., parking lots, alleys, loading zones, standing zones, etc.). The approach, for example, involves collecting probe data transmitted from a plurality of vehicles traveling on a road segment. The approach also involves processing the probe data to determine a vehicle behavior indicating a vehicle parking location, a vehicle stopping location, a vehicle standing location, or a combination thereof. The approach further involves flagging the road segment as being associated with the vehicle parking location, the vehicle stopping location, the vehicle standing location, or a combination thereof based on the vehicle behavior to update a geographic database.

20 Claims, 13 Drawing Sheets

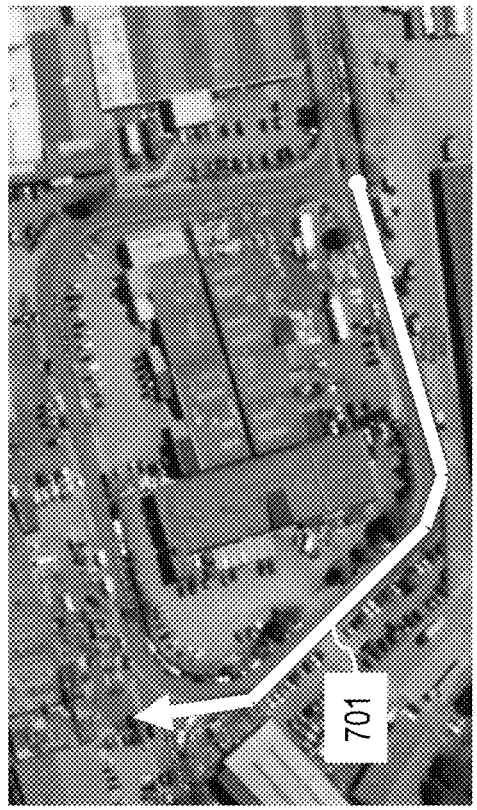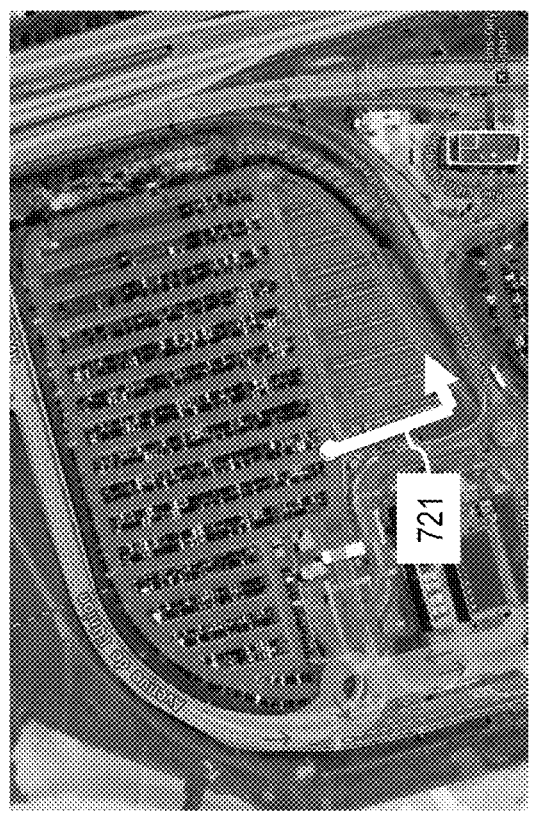
FIG. 7A
FIG. 7B

METHOD AND APPARATUS FOR DETECTING A VEHICLE PARKING, STOPPING, OR STANDING LOCATION

BACKGROUND

Mapping services providers face significant technical challenges to providing map data that accurately reflect real-word points-of-interests or features. For example, providing data on locations where vehicles can park, stop, or stand (e.g., parking lots, loading zones, standing zones, alleys, etc.) when they arrive at their destinations is an area of interest. Mapping such locations, however, has traditionally been a resource-intensive and time-consuming manual process, which can limit how often map services update their map data and related products.

SOME EXAMPLE EMBODIMENTS

Therefore, there is a need for an approach for automatically detecting vehicle parking, stopping, and/or standing locations to generate or update map data.

According to one embodiment, a method comprises collecting probe data transmitted from a plurality of vehicles traveling on a road segment. The method also comprises processing the probe data to determine a vehicle behavior indicating a vehicle parking location, a vehicle stopping location, a vehicle standing location, or a combination thereof (e.g., parking lots, loading zones, standing zones, alleys, etc.). The method further comprises flagging the road segment as being associated with the vehicle parking location, the vehicle stopping location, the vehicle standing location, or a combination thereof based on the vehicle behavior. The method further comprises updating a geographic database to indicate the vehicle parking location, the vehicle stopping location, the vehicle standing location, or a combination thereof based on the flagging.

According to another embodiment, an apparatus comprises at least one processor, and at least one memory including computer program code for one or more computer programs, the at least one memory and the computer program code configured to, with the at least one processor, cause, at least in part, the apparatus to collect probe data transmitted from a plurality of vehicles traveling on a road segment. The apparatus is also caused to process the probe data to determine a vehicle behavior indicating a vehicle parking location, a vehicle stopping location, a vehicle standing location, or a combination thereof (e.g., parking lots, loading zones, standing zones, alleys, etc.). The apparatus is further caused to flag the road segment as being associated with the vehicle parking location, the vehicle stopping location, the vehicle standing location, or a combination thereof based on the vehicle behavior. The apparatus is further caused to update a geographic database to indicate the vehicle parking location, the vehicle stopping location, the vehicle standing location, or a combination thereof based on the flagging.

According to another embodiment, a non-transitory computer-readable storage medium carries one or more sequences of one or more instructions which, when executed by one or more processors, cause, at least in part, an apparatus to collect probe data transmitted from a plurality of vehicles traveling on a road segment. The apparatus is also caused to process the probe data to determine a vehicle behavior indicating a vehicle parking location, a vehicle stopping location, a vehicle standing location, or a combination thereof (e.g., parking lots, loading zones, standing zones, alleys, etc.). The apparatus is further caused to flag the road segment as being associated with the vehicle parking location, the vehicle stopping location, the vehicle standing location, or a combination thereof based on the vehicle behavior. The apparatus is further caused to update a geographic database to indicate the vehicle parking location, the vehicle stopping location, the vehicle standing location, or a combination thereof based on the flagging.

According to another embodiment, an apparatus comprises means for collecting probe data transmitted from a plurality of vehicles traveling on a road segment. The apparatus also comprises means for processing the probe data to determine a vehicle behavior indicating a vehicle parking location, a vehicle stopping location, a vehicle standing location, or a combination thereof (e.g., parking lots, loading zones, standing zones, alleys, etc.). The apparatus further comprises means for flagging the road segment as being associated with the vehicle parking location, the vehicle stopping location, the vehicle standing location, or a combination thereof based on the vehicle behavior. The apparatus further comprises means for updating a geographic database to indicate the vehicle parking location, the vehicle stopping location, the vehicle standing location, or a combination thereof based on the flagging.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7D are diagrams illustrating example detections of a vehicle parking, stopping, or standing location, according to one embodiment;

DESCRIPTION OF SOME EMBODIMENTS

Examples of a method, apparatus, and computer program for detecting a vehicle parking, stopping, or standing location are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
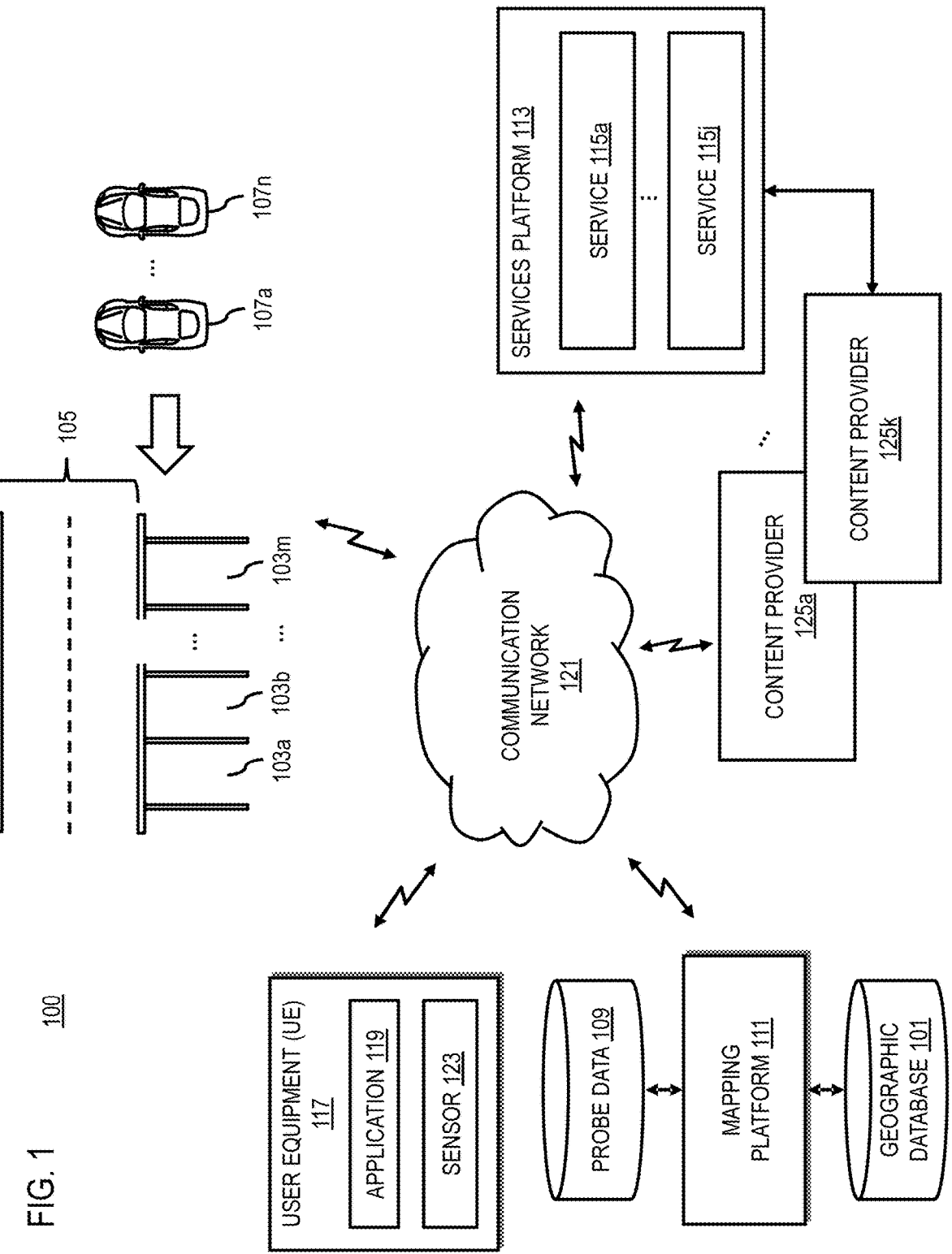
FIG. 1 is a diagram of a system capable of automatically detecting a vehicle parking, stopping, or standing location, according to one embodiment.

FIG. 1 is a diagram of a system capable of automatically detecting a vehicle parking, stopping, or standing location, according to one embodiment. A component of a comprehensive traffic and map product in today's connected world is accurate/correct location referencing. For a variety of products and user needs, correctly being able to identify locations/points of interest on a digital map (e.g., as provided via a geographic database 101) has applicable value. Points of interest for a driver typically range from specific locations they want to route to (such as an address, a store, an airport, etc.) to locations 103-103m (also collectively referred to as locations 103) on or near a road segment 105 at which they can park/stand their vehicle (e.g., vehicles 107a-107n, also collectively referred to as vehicles 107) for a certain period. In particular, drivers that use navigation services to arrive at a location by a vehicle 107 will generally also need to be instructed where the nearest vehicle parking, stopping, and/or location options (e.g., locations 103) are as the driver's knowledge of or familiarity with the area may limited. In addition, the same can be said for trucks or other commercial vehicles 107 looking for locations 103 that are warehouse areas/loadings zones (e.g., accurate routing to locations 103 is relevant to time constraints under commercial vehicles 107 typically operate). Therefore, to provide a more complete navigation and/or mapping service, service provides face significant technical challenges to determine accurate location referencing to vehicle parking, stopping, and/or standing locations 103 such as but not limited to parking lots, alleys, loading zones, and vehicle standing locations.

Identifying locations 103 such as parking lots, alleys, truck/warehouse loading zones, standing zones, and/or other such locations is a technically difficult and expensive process when generating a map such as the geographic database 101. Traditional methods generally involve manual efforts by map drive teams when driving through an area/route as well as other data sources in identifying said locations. In other words, map generation involves using a variety of data sources as well as "on the ground" data capture vehicles/manpower to identify locations 103 on or near a road segment 105 such as but not limited to parking lots, loading zones, alleys, etc. as road locations in digital map data. These traditional processes, however, can suffer significantly from inaccuracies and data quality issues that lead to a significant number of parking, stopping, and/or standing locations 103 going unlabeled or missed. Accordingly, technical challenges can arise for service providers because vehicle parking, stopping, and/or standing locations 103 tend to be frequently missed by traditional map solutions in labeling the roadway areas (e.g., roads 105) as corresponding to correct locations 103 (e.g., parking lots, loading zones, etc.).

To address these technical challenges, the system 100 of FIG. 1 introduces a capability to automatically detect vehicle parking, stopping, and/or standing locations 103 using probe data 109 (e.g., collected from probe vehicles 107) that can be used to supplement or improve the accuracy of the geographic database 101 as well as to potentially reduce overall resource requirements (e.g., computing resources, monetary costs, etc.) for generating the data. In one embodiment, the system 100 uses the probe data 109 to identify likely road locations 103 that exhibit vehicle behavior that is associated with parking lots, loading zones, standing zones, alleys, etc. and flag them for addition to the geographic database 101. The system 100, for instance, can use a naïve/greedy algorithm approach, a machine learning approach, or a combination thereof to detect vehicle behavior based on the probe features generated from the probe data.

More specifically, the system 100 analyzes probe data for road segments of interest across a region to look for vehicle behavior that can be used to flag potential road segments 105 as vehicle parking, stopping, and/or standing locations 103 (e.g., parking lots, loading zones, standing zones, alleys, etc.). As either a naïve/greedy algorithm or as a machine learning approach, the system 100 would use features generated from the probe data 109 itself over a period of time (e.g., a significant period of time such as quarter year of data to keep in line with map updates) and monitor the vehicle behavior patterns of the probe data 109 over the course of the selected period of time. In one embodiment, the system 100 monitors or derives vehicle behaviors and/or related features from the probe data 109 that are indicative of vehicle parking, stopping, and/or standing behaviors such as but not limited to: (1) vehicles 107 spending significant periods of time standing/not moving while still transmitting probe data, (2) reoccurring appearances of the same vehicle 107 on the same roadway segment 105, (3) speed distribution profiles over the duration a vehicle 107 is active within a specific roadway segment 105.

The system 100 can select vehicle behaviors that have been determined to be a predictor in identifying parking/stopping/standing locations 103 (e.g., behaviors that have correlations above a threshold value to the locations 103 based on historical data). For example, speed distribution profiles can be generated by monitoring a vehicle 107 that is active within a specific roadway 105 and then used as significant predictor in identifying locations 103 such as parking lots. Generally, it is noted that the combined speed distribution profile for a roadway 105 across all vehicles 107, for parking lots, loading zones, etc., can have a significant percentile of the probe data 109 being zero speeds (or near zero speeds below a speed threshold value). In addition, some locations 103 such as truck loading zones, warehouse parking lots, etc. have a significant proportion of vehicles 107 that continue to return to said location 103 day to day, week to week, and month to month.

In one embodiment, combining these behaviors or features with other probe-derived features and/or map-derived features (e.g., roadway shapepoints/sinuosity/node-to-node bearing change, etc.) can be used to help reduce edge case scenarios and/or false positives detections of locations 103 from probe data. In one embodiment, positive signals of the locations 103 as detected from vehicle behaviors would flag the observed roadways 105 as a parking lot, alley, etc. based on the output generated the system 100. The system 100 can then apply the detected parking/stopping/standing locations 103 to the map artifact of the geographic database 101.

The embodiments of the system 100 described herein provide several advantages such as but not limited to:
  Enhances the map artifact of the geographic database 101 with missed/inaccurate locations 103 of parking lots, loading zones, alleyways, etc.;
  Reduces cost and resource requirements associated with manual identification of parking lots, loading zones, alleyways, etc.;
  Uses existing data sources (e.g., the geographic database 101 and probe database 109) already collected or owned by map service providers, and does not require new sources of data other than the exist; and
  Can be run as a batch process in synchronization with map refresh updates (such as quarterly map updates) keeping the map as up to date as possible with changes to the map/roadway.

Figure 2:
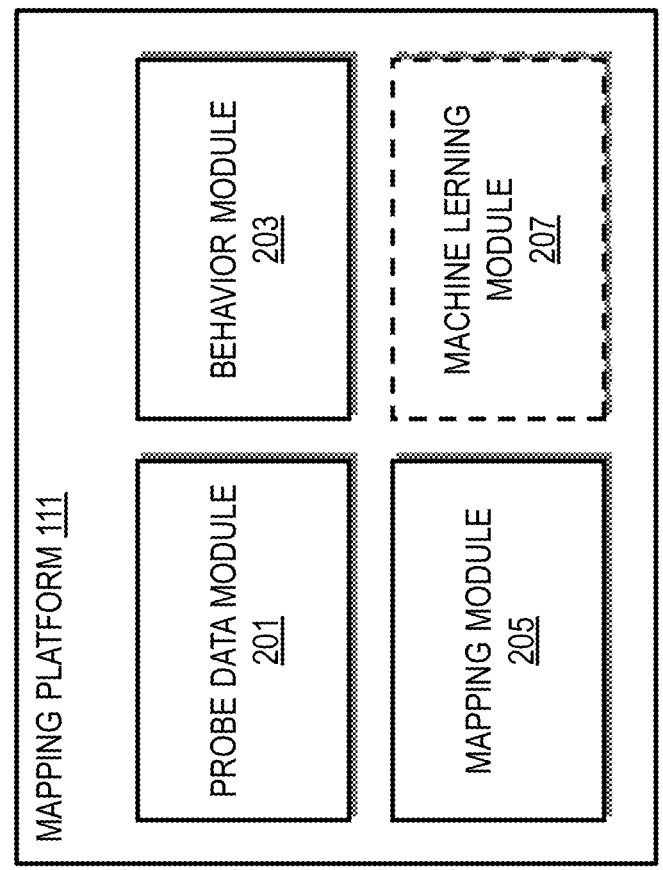
FIG. 2 is a diagram of a mapping platform capable of automatically detecting a vehicle parking, stopping, or standing location, according to one embodiment.

In one embodiment, the system 100 includes a mapping platform 111 that is capable of performing one or more functions related to automatically detecting a vehicle parking, stopping, or standing location 103, according to one embodiment. In one embodiment, as shown in FIG. 2, the mapping platform 111 includes one or more components to perform the functions. It is contemplated that the functions of these components may be combined or performed by other components of equivalent functionality. In this embodiment, the mapping platform 111 includes a probe data module 201, behavior module 203, mapping module 205, and an optional machine learning module 207. The above presented modules and components of the mapping platform 111 can be implemented in hardware, firmware, software, or a combination thereof. Though depicted as a separate entity in FIG. 1, it is contemplated that the mapping platform 111 may be implemented as a module of any other component of the system 100 (e.g., a component of the services platform 113, any of the services 115*a*-115*j* (also collectively referred to as services 115) of the services platform 113, vehicles 107, user equipment (UE) device 117, application 119 executing on the UE 117, etc.). In another embodiment, one or more of the modules 201-207 may be implemented as a cloud-based service, local service, native application, or combination thereof. The functions of the mapping platform 111 and the modules 201-207 are discussed with respect to FIGS. 3-7 below.

Figure 3:
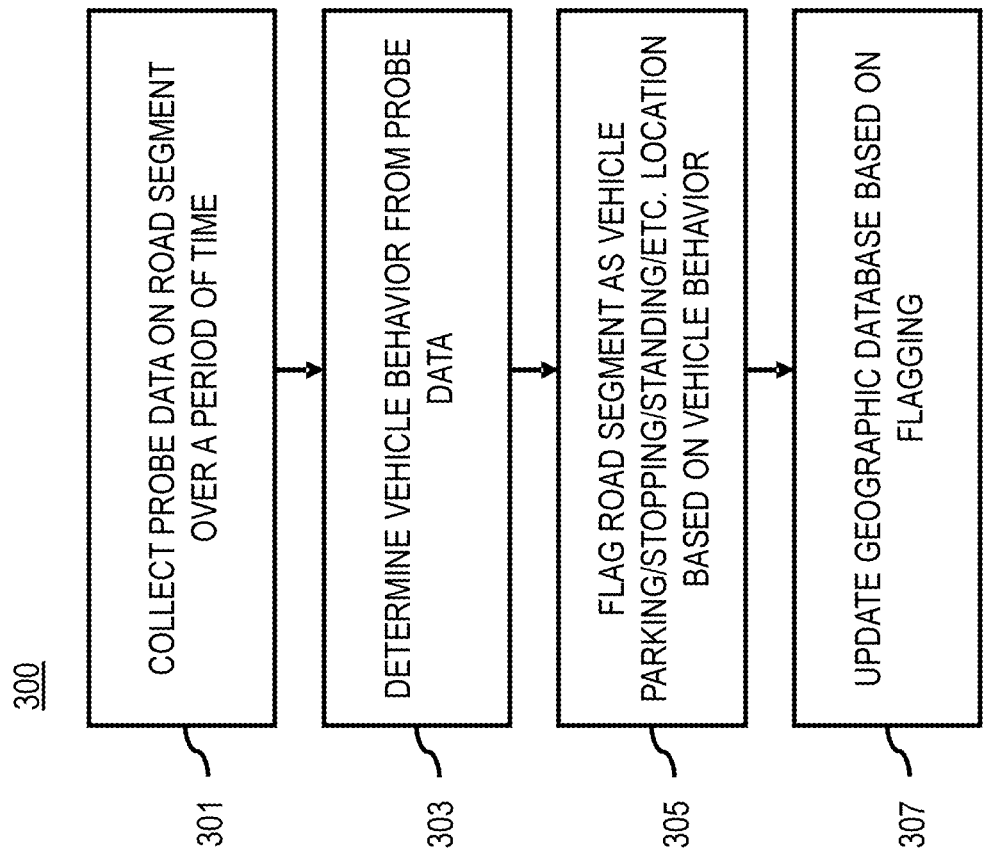
FIG. 3 is a flowchart of a process for automatically detecting a vehicle parking, stopping, or standing location, according to one embodiment.
Figure 10:
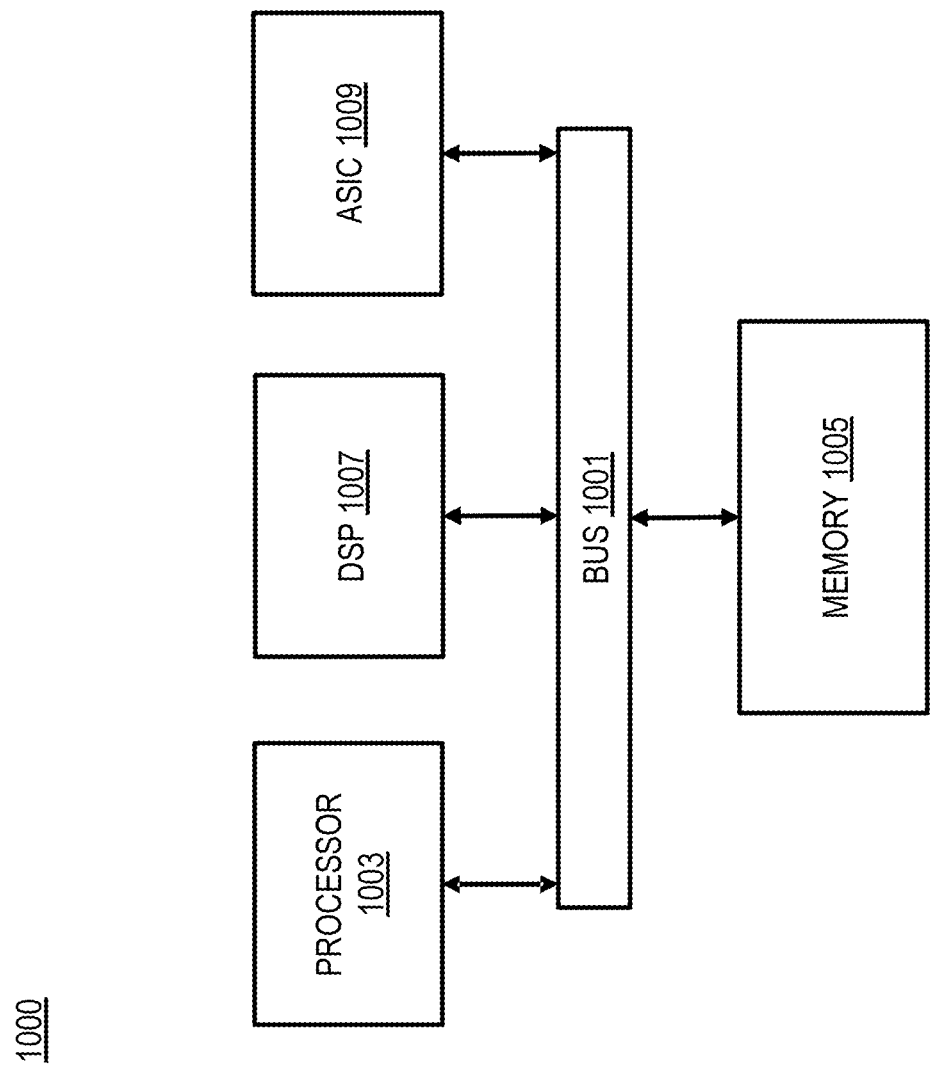
FIG. 10 is a diagram of a chip set that can be used to implement an embodiment.

FIG. 3 is a flowchart of a process for automatically detecting a vehicle parking, stopping, or standing location, according to one embodiment. In various embodiments, the mapping platform 111 and/or any of the modules 201-207 of the mapping platform 111 may perform one or more portions of the process 300 and may be implemented in, for instance, a chip set including a processor and a memory as shown in FIG. 10. As such, the mapping platform 111 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In step 301, the probe data module 201 collects probe data transmitted from a plurality of vehicles traveling on a road segment. The road segment can be among one or more road segments or links that are being monitored by the mapping platform 111 to generate or update map data (e.g., as stored in the geographic database 101). For example, the mapping platform 111 can designate a geographic area (or all geographic areas) for monitoring, and then query the geographic database 101 for all links within the designated area. The mapping platform 111 can then query the probe data database 109 for the probe data collected from the identified road segments or links.

In one embodiment, the probe data 109 can be generated by probe vehicles 107 traveling within the designated geographic area or the road segments within the geographic area and transmitted for collection in the probe data database 109 over a communication network 121. In addition or alternatively, the probe data can be generated by probe devices (e.g., UE 117 devices such as but not limited to personal navigation devices, smartphones, etc.) equipped with location sensors 123 that are associated with the vehicles 107 traveling in the geographic area of interest. The probe data can include but is not limited to a sensed location (e.g., latitude, longitude, altitude) of the probe vehicle 107 or device 117 as well as other information such as but not limited to a timestamp indicating the time the location was sensed, a vehicle or probe ID to identify the probe, and/or the like.

In step 303, the behavior module 203 processes the probe data to determine a vehicle behavior indicating a vehicle parking location, a vehicle stopping location, a vehicle standing location, or a combination thereof (e.g., a parking/stopping/standing location 103). By way of example, the vehicle parking location, the vehicle stopping location, the vehicle standing location, or a combination thereof can include but is not limited to a parking lot, a loading zone, an alley, a standing zone, or a combination thereof. For example, probe data 109 drawn from areas or road segments being monitored would be broken down into vehicle behaviors or probe features that have been found to be useful in identifying vehicle parking/stopping/standing locations 103 or areas. Examples of these vehicle behaviors or probe features include but are not limited to:

Probe speeds—e.g., the reported or calculated speed of a probe vehicle 107 traveling on the monitored road segment (e.g., calculated based on the distance and time between tow probe points reported for a vehicle or probe ID);

Probe Speed ratios/proportions—e.g., the calculated ratios of speeds of all vehicles 107 traveling on the monitored road segment over a designated period of time, which represent the overall speed profile distribution of the road segment;

Reoccurring Vehicle IDs over Time—e.g., the calculated number of vehicles 107 are detected to revisit the monitored road segment periodically over the monitored time period;

Historical Vehicle Counts—e.g., the calculated number of vehicles 107 that have traveled on the monitored road segment for previous periods of time other than the current monitoring period;

Roadway Shape/Bearing changes—e.g., the topography of the monitored road segment (e.g., as determined form the map data of the geographic database) that reflects the shape, direction, contours, etc. of the road segment; and Map artifact location label—e.g., the labeled location of the monitored road segment as determined from the geographic database 101.

In other words, the behavior module 203 can process the probe data to extract one or more features from the probe data. The vehicle behavior can be further based on or determined from the one or more extracted features.

Figure 4A:
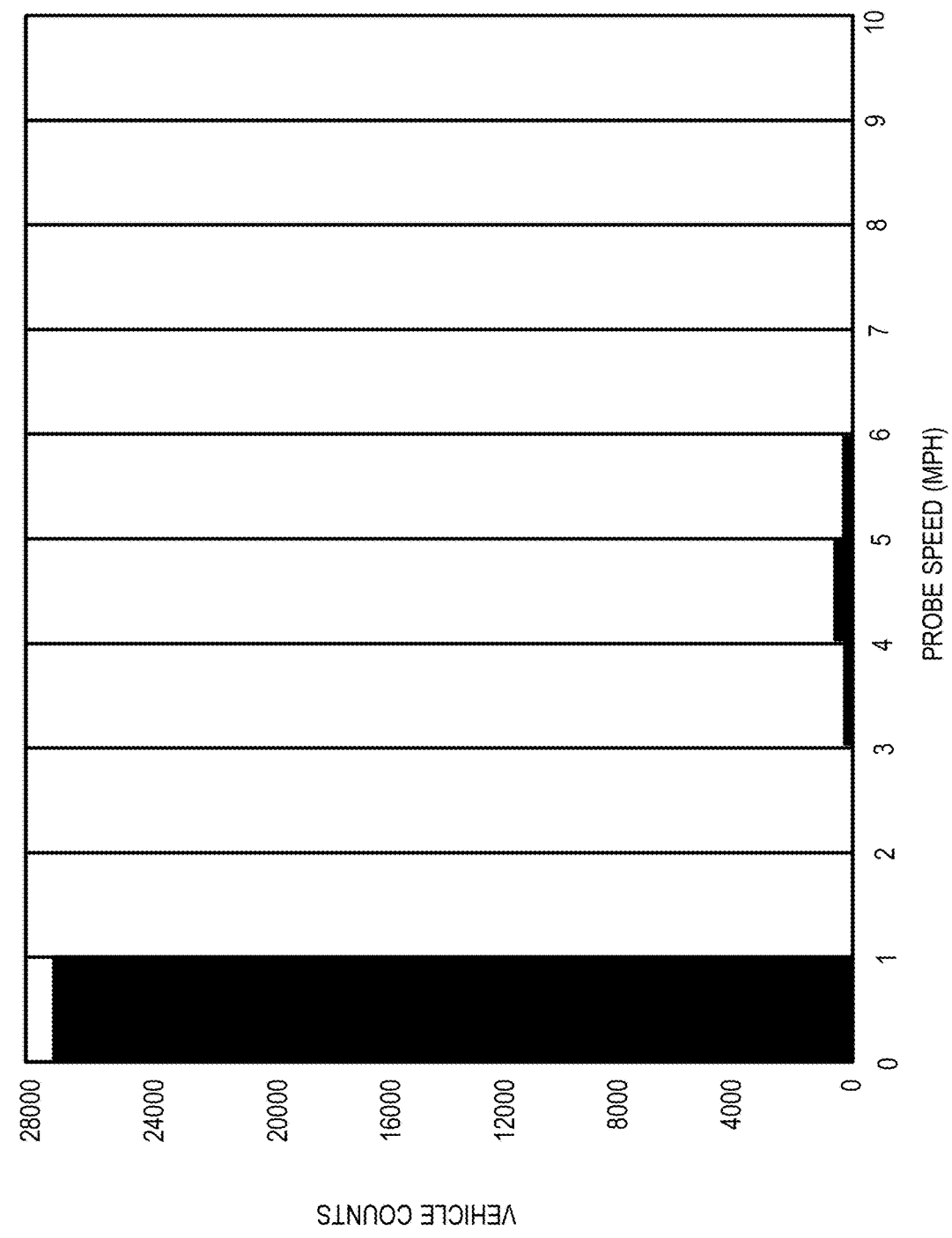
FIGS. 4A and 4B are diagrams illustrating example speed profiles for detecting a vehicle parking, stopping, or standing location, according to one embodiment.
Figure 4B:
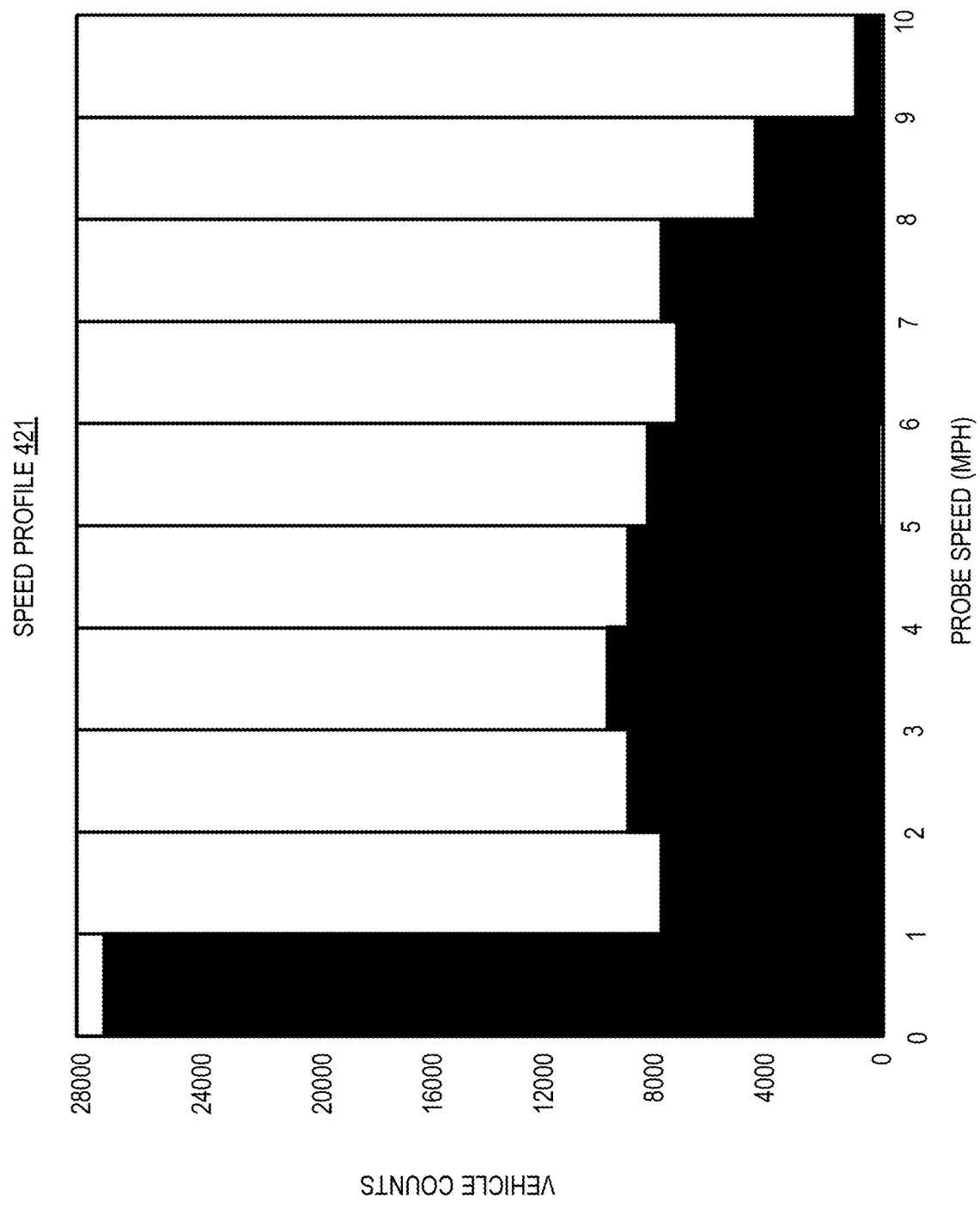

For example, in one embodiment, the vehicle behavior can include a vehicle standing or moving below a threshold speed while continuing to transmit or to generate the probe data. FIGS. 4A and 4B are diagrams illustrating example probe speed profiles used for detecting a vehicle parking, stopping, or standing location based on such a behavior, according to one embodiment. FIGS. 4A and 4B are two different example speed profiles associated with different types of parking/stopping/standing locations. The speed profiles are generated by collecting probe data from a monitored road segment over a designated period of time, and then clustering the probe speeds determined from the data according to travel speed, with each cluster aggregating a count of the probe vehicles 107 traveling at the corresponding speed.

In the example of FIG. 4A, the monitored road segment is a pure parking lot segment (e.g., a road segment used exclusively as part of a parking lot). The resulting speed profile 401 includes a high proportion or ratio of vehicle counts that are not moving (e.g., with a speed of 0 mph) versus vehicles that are moving at 1 mph or faster. This behavior module 203 can then use the speed profile 401 or similar as a predictor or indicator of the road segment being a pure parking lot. In the example of FIG. 4B, the monitored road segment is a mixed a mixed parking lot/roadway (e.g., a road segment with on-street parking) resulting in a slightly different speed profile 421 from the speed profile 401 of FIG. 4A. As shown, the speed profile 421 still includes a high proportion of proportion of vehicle counts that are not moving (e.g., parked vehicles 107), but the proportion is lower than in the speed profile 401. In the speed profile 421, the probe data indicates that there are more vehicles moving (e.g., traveling at 1 mph or faster, or faster than any other threshold speed used to distinguish between moving and non-moving vehicles). The behavior module 203 can then use the speed profile 421 as a predictor of the road segment being a mixed parking lot/roadway.

In other words, in one embodiment, the behavior module 203 processes the probe data to determine a speed distribution profile of the plurality of vehicles that traveled on the monitored road segment. The vehicle behavior determined from the probed data can then be further based on the speed distribution profile. For example, the speed distribution profile can include a percentile of the probe data above a percentile threshold that is associated with a zero speed, a speed below a speed threshold, or a combination thereof.

Figure 5:
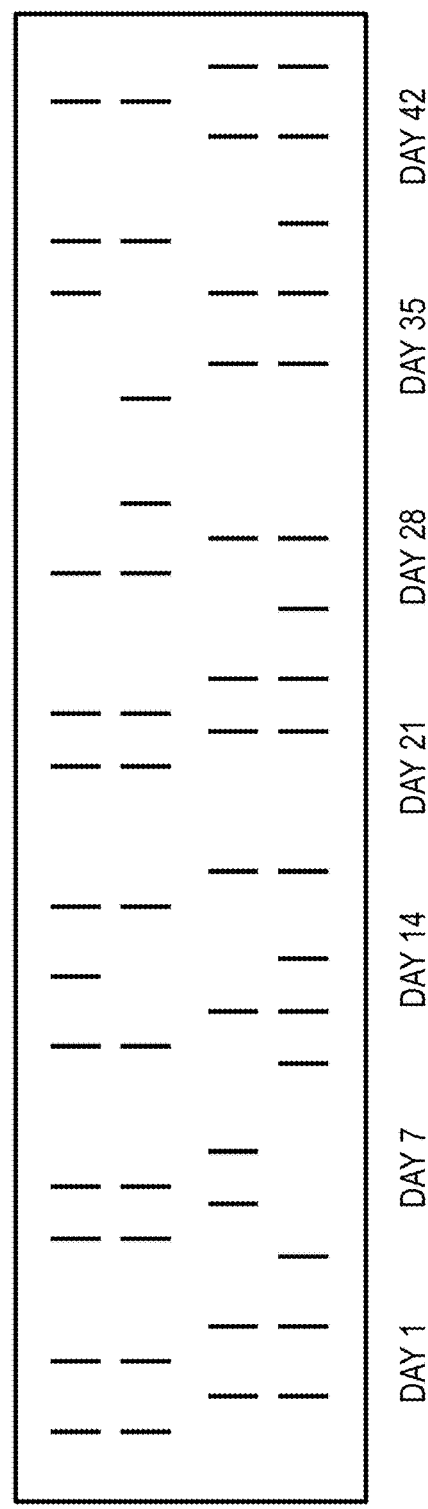
FIG. 5 is a diagram illustrating an example of detecting a reoccurrence of a vehicle on a road segment to detect a vehicle parking, stopping, or standing location, according to one embodiment.

In yet another embodiment, the vehicle behavior detected from probe data can include a reoccurrence of a vehicle on the road segment within a period of time. FIG. 5 is a diagram 501 illustrating an example of detecting a reoccurrence of a vehicle on a road segment to detect a vehicle parking, stopping, or standing location, according to one embodiment. As shown, the diagram 501 is a visual representation of vehicles 107a-107d cyclically reappearing at a road segment that is loading zone parking lot over the course of days 1-42 of the monitoring period. The lines or vertical dashes following each listed vehicle 107a-107d indicates that the probe data shows that the corresponding vehicle 107 appeared on the monitored road segment on the indicated day. In some cases, this type of behavior can be indicative of parking lots or loading zones across many different countries or regions. Therefore, in a significant number of positive flags indicating that a road segment is a parking/stopping/standing location 103, this kind of vehicle behavior can be observed consistently, particularly when coupled with other positive data signals such as the above speed profiles or any other probe feature or vehicle behavior.

After extracting or determining the vehicle behaviors and/or probe features from the probe data for a monitored road segment, the behavior module 203 can use any combination of the vehicle behaviors and/or probe features to predict or determine whether the monitored road segment is a vehicle parking, stopping, and/or standing location 103. In one embodiment, the behavior module 203 can use a naïve/greedy algorithm approach (e.g., applying computed behaviors or features against classification thresholds), machine learning approach (e.g., using the computed behaviors or features as input features into a trained machine learning model), or equivalent to make a prediction about the monitored road segment. For either the naïve/greedy algorithm approach or a machine learning approach, the behavior module 203 can tune the respective approaches using test or training/ground truth data generated from known parking lot, loading zone, alleyway, etc. road segments as illustrated below.

Figure 6:
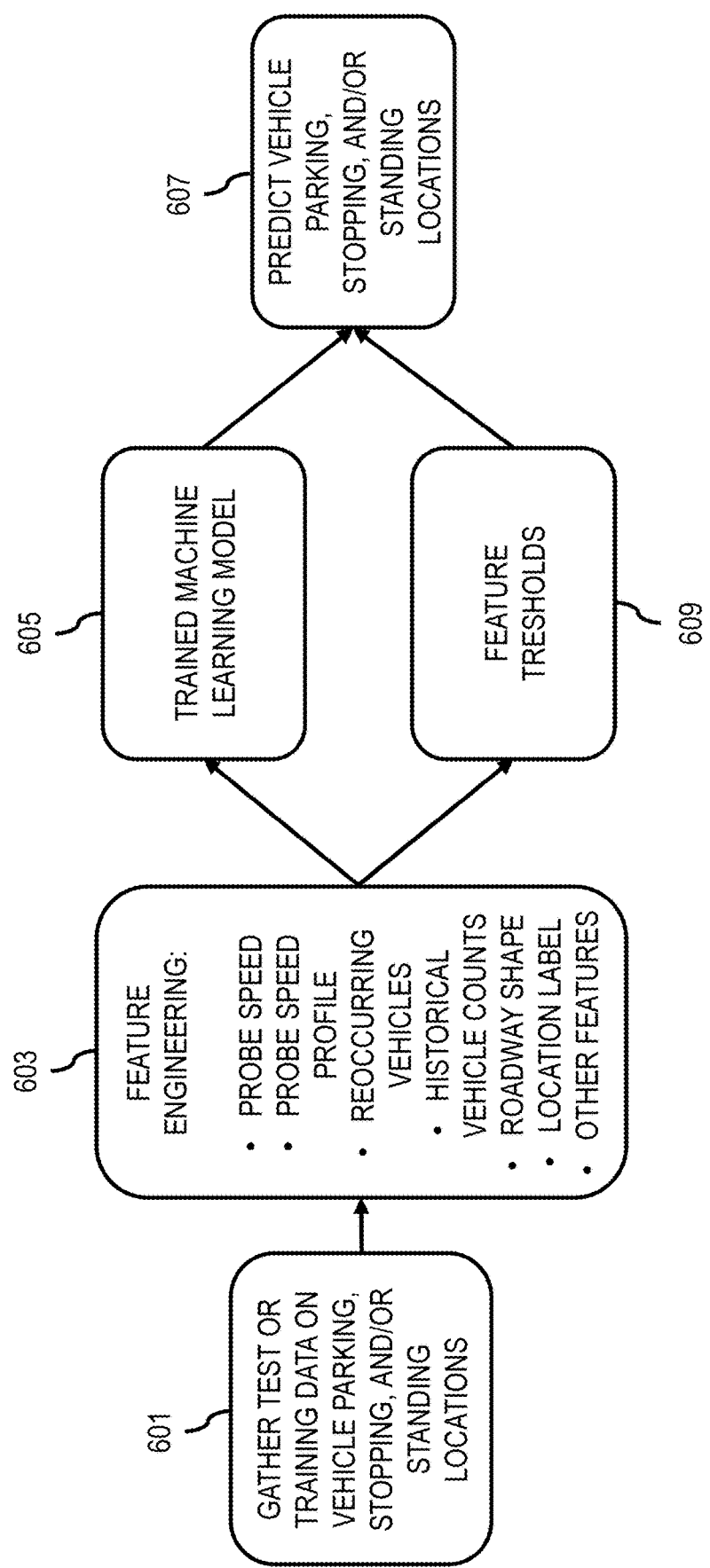
FIG. 6 is a diagram illustrating example architectures for detecting a vehicle parking, stopping, or standing location, according to one embodiment.

FIG. 6 is a diagram illustrating an example architectures (e.g., naïve/greedy algorithm and machine learning) for detecting a vehicle parking, stopping, or standing location, according to one embodiment. In the first process 601, the behavior module 203 can gather test or training data for making a prediction of a vehicle parking, stopping, and/or standing location 103 according to the embodiments described herein. The test or training data can include, for instance, probe data collected from road segments that are known to be or were previously flagged as vehicle parking, stopping, and/or standing locations 103. In one embodiment, the probe data can be historical data taken from archived probe data.

From a machine learning approach, the behavior module 203 uses the optional machine learning module 207 to take the above inputs of the process 601 pulled from probe archives and/or the map artifact (e.g., the geographic database 101) to come up with training data. This training data would consist of roadways that fit the profile such as parking lots, standing zones, alleyways, loading zones, etc. along with regularly traveled roads such as highways, arterial streets, suburb roads, etc. The machine learning module 207 then uses this data to perform feature engineering to extract features and vehicle behaviors (e.g., probe speed, speed profiles, reoccurring vehicles, historical vehicle counts, roadway shape, map artifact location labels, and/or other features) to complete the training data set (process 603). In one embodiment, the machine learning module 207 uses the training data to create a trained machine learning model 605. In other words, the machine learning model 605 would "learn" the differences between parking/stopping/standing location roads versus non-parking/stopping/standing location roads, and the identifying characteristics in the feature data provided.

For example, during training, the machine learning module 207 feeds extracted vehicle behavior and/or probe feature sets into the machine learning model 605 to compute a predicted road classification using an initial set of model parameters. The machine learning module 207 then compares the predicted road classification (e.g., parking/stopping/standing location versus non-parking/stopping/standing location) to the ground truth or training data (e.g., generated in processes 601 and 603). The machine learning module 207, for instance, computes a loss function representing an accuracy of the predictions for the initial set of model parameters. The machine learning module 207 then incrementally adjusts the model parameters until the model minimizes the loss function (e.g., achieves a target prediction accuracy). In other words, a "trained" machine learning model 605 is a machine learning model with parameters (e.g., coefficients, weights, etc.) adjusted to make accurate predictions with respect to the ground truth data.

The behavior module 203 can then apply the trained machine learning model 605 across different road networks to classify individual road segments as vehicle parking, stopping, and/or standing locations or not (process 607).

In one embodiment, as an alternative to the machine learning approach described above, an approach using a naïve/greedy algorithm based comparing determined features against corresponding threshold values could be used. For example, this simpler approach would create feature thresholds 609 for one or more of the vehicle behaviors or probe features determined in the process 603. By way of example, the behavior module 203 can discover the feature thresholds 609 through previous research or historical data in the test data set 601 that are computed for the vehicle behaviors and/or probe features discussed above. The behavior module 203 can also combine the feature thresholds 609 to create a confidence value that, if reached, would predict that a specific roadway is a vehicle parking/stopping/ standing location. For example, these feature thresholds 609 can be based on but not limited to the proportion of non-moving vehicles, reoccurring vehicle IDs, etc. In contrast to the machine learning approach, the naïve/greedy algorithm approach could be useful if the accuracy is acceptable coupled with a reduction in cost/time requirements.

Returning to the process 300 of FIG. 3, in step 305, the mapping module 205 flags the road segment as being associated with the vehicle parking location, the vehicle stopping location, the vehicle standing location, or a combination thereof based on the vehicle behavior and/or road classifications predicted in the above processes. Flagging can include but is not limited to updating a data value of a data field of a road link record of the geographic database 101 or map artifact associated with the monitored road segment to indicate that a positive signal indicating that the road segment is likely a vehicle parking, stopping, and/or standing location.

In step 307, the mapping module 205 updates a geographic database (e.g., the geographic database 101 to indicate the vehicle parking location, the vehicle stopping location, the vehicle standing location, or a combination thereof based on the flagging. In other words, the mapping module 205 can update a production or published version of the geographic database 101 or map artifact to indicate that the flagged road segments records are vehicle parking, stopping, and/or standing locations. In an alternative embodiment, the flagging performed in step 305 can also be the updating step of 307 so that flagged results automatically result in an updated production or published version of the geographic database 101 or a published map artifact update package.

FIGS. 7A-7D are diagrams illustrating example detections of a vehicle parking, stopping, or standing location, according to one embodiment. More specifically, the examples of FIGS. 7A-7D are areas or road segments with probe data that exhibit vehicle behaviors or probe features indicative of vehicle parking, stopping, and/or standing locations (e.g., based on machine learning predictions or comparisons against applicable feature thresholds and/or confidence levels).

In example 700 of FIG. 7A, a road segment 701 has been classified as a mixed parking area and roadway. As shown, the road segment 701 supports through traffic with on-street parking. This configuration can result in a speed profile where there is a high proportion of vehicles that are not moving (e.g., have probe speeds indicating 0 mph) to vehicles that are moving (e.g., through vehicles moving at relatively low speeds). Based on these features among others, the mapping platform 111 can classify the road segment 701 as a mixed vehicle parking and travel road segment.

In example 720 of FIG. 7B, a road segment 721 has been classified as a pure parking lot. As shown, the road segment 721 is part of a parking lot and does not support through traffic other than traffic within the parking lot itself. This configuration can result in a speed profile where there is a high proportion of vehicles that are not moving (e.g., have probe speeds indicating 0 mph) to vehicles that are moving (e.g., vehicles driving within the parking lot to either enter or leave a parking space in the lot). Based on these features among others, the mapping platform 111 can classify the road segment 721 as a pure parking lot.

Figure 7C:
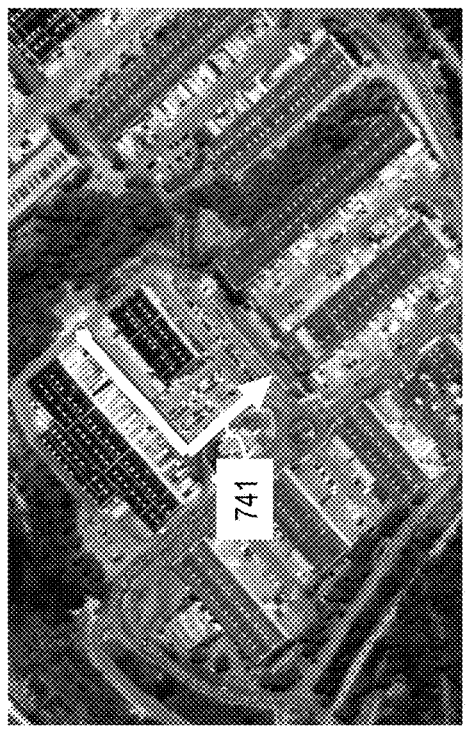

In example 740 of FIG. 7C, a road segment 741 has been classified as an alleyway. As shown, the road segment 741 is located between two commercial buildings (e.g., determined from the geographic database 101) with potential loading zones in the alley. This configuration can result in a speed profile where there is a high proportion of vehicles that are not moving (e.g., have probe speeds indicating 0 mph) to vehicles that are moving (e.g., vehicles moving at relatively low speeds through the alley). In addition, commercial trucks belonging or delivering to the commercial businesses located along the alley can result in probe data indicating reoccurring vehicles on the road segment 741 (e.g., reoccurring as the trucks come back to load and/or unload on regular schedules). Based on these features among others, the mapping platform 111 can classify the road segment 741 as an alleyway/loading zone.

Figure 7D:
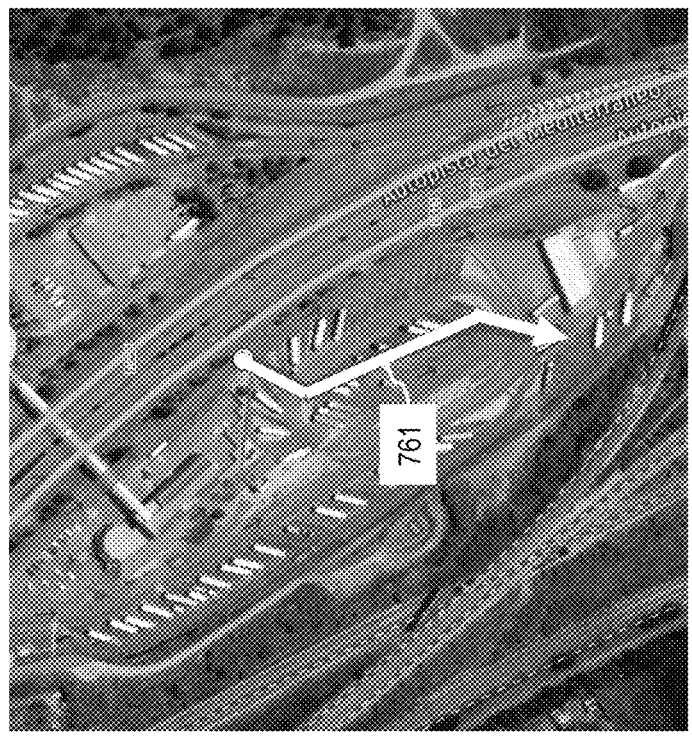

In example 760 of FIG. 7D, a road segment 761 has been classified as loading zone. As shown, the road segment 761 is located behind an industrial building with parking and loading locations for trucks. This configuration can result in a speed profile where there is a high proportion of vehicles that are not moving (e.g., have probe speeds indicating 0 mph) to vehicles that are moving (e.g., vehicles moving at relatively low speeds through the loading zone). In addition, commercial trucks belonging or delivering to the industrial building can result in probe data indicating reoccurring vehicles on the road segment 761 (e.g., reoccurring as the trucks come back to load and/or unload on regular schedules). Based on these features among others, the mapping platform 111 can classify the road segment 761 as an alleyway/loading zone.

Returning to FIG. 1, the system 100 includes the mapping platform 111 for performing the processes for automatically detecting vehicle parking, stopping, and/or standing locations according to the various embodiments described herein. As shown, the mapping platform 111 has connectivity to the vehicles 107 and/or UEs 117 for collecting probe data or location traces from which such locations can be detected. In one embodiment, the vehicles 107 and/or one or more UEs 117 associated with a vehicle 107 can act as probe vehicles or devices traveling over a road network represented in the geographic database 101. Although the vehicle 107 is depicted as an automobile, it is contemplated that the vehicle 107 can be any type of transportation vehicle manned or unmanned (e.g., motor cycles, buses, trucks, boats, bicycles, etc.), and the UE 117 can be associated with any of the types of vehicles 107 or a person or thing traveling through the road network of the geographic database 101.

For example, the UE 117 can be a standalone device (e.g., mobile phone, portable navigation device, wearable device, etc.) or installed/embedded in the vehicle 107. In one embodiment, the vehicle 107 and/or UE 117 may be configured with one or more sensors (e.g., sensors 123) for determining location or probe data. By way of example, the sensors may include location sensors (e.g., GPS), accelerometers, compass sensors, gyroscopes, altimeters, etc. In one embodiment, the sensors can also be used to detect and report status data about an operational state of the vehicle 107 to assist in determining when the vehicle 107 parks in or leaves a parking space. For example, a parking event may be detected when it is determined that a vehicle's is engine off, the key is outside of the car, the vehicle door is locked, and/or the like. In one embodiment, the vehicle 107 and/or UE 117 are assigned unique probe identifiers (probe or vehicle ID) for use in reporting or transmitting collected probe data. The vehicle 107 and UE 117, for instance, are part of a probe-based system for collecting probe data for updating the map artifact according to the various embodiments described herein.

In one embodiment, when a vehicle 107 and/or UE 117 (e.g., via a navigation system, navigation application 119, and/or the like) requests instructions to find parking in a given area or location, the mapping platform 111 can use the determine the vehicle parking, stopping, and/or standing locations as detected according to the embodiments described herein. The mapping platform 111 can then provide routing information based on the vehicle parking/stopping/standing locations to the vehicle 107 and/or the UE 117 for presentation in a mapping or navigation user interface. For example, vehicle parking/stopping/standing locations can be used to route a user (e.g., routing to a nearest parking, stopping, standing location to the user's destination).

In one embodiment, as noted above, the vehicles 107 are equipped with an embedded navigation systems or other navigation devices (e.g., a UE 117) that are capable of submitting requests for routing information (e.g., parking availability, etc.), and of guiding a driver of the vehicle 107 along a navigation route using the automatically detected vehicle parking, stopping, and/or standing locations.

In one embodiment, the vehicle 107 and/or UE 117 are configured to report probe data as probe points, which are individual data records that record telemetry data collected at a point in time. In one embodiment, a probe point can include attributes such as a heading, a speed, a time, or a combination thereof of each of the plurality of devices. At least some of these attributes can also be used as classification features. It is contemplated that any combination of these attributes or other attributes may be recorded as a probe point. As previously discussed, the vehicle 107 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior.

In one embodiment, the mapping platform 111, the vehicles 107, and/or the UE 117 can interact with a services platform 11, one or more services 115, one or more content providers 125a-125k (also collectively referred to as content providers 125), or a combination thereof over communication network 121 to provide functions and/or services based on the parking occupancy model created according to the various embodiments described herein. The services platform 11, services 115, and/or content providers 125 may provide mapping, navigation, and/or other location based services to the vehicle 107 and/or UE 117.

By way of example, the UE 117 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the mapping platform 111 may be implemented as a cloud based service, hosted solution or the like for performing the above described functions. Alternatively, the mapping platform 111 may be directly integrated for processing data generated and/or provided by the services platform 11, services 115, content providers 125, and/or applications 119. Per this integration, the mapping platform 111 may perform client-side parking occupancy model building based on historical parking occupancy data.

By way of example, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the mapping platform 111 communicates with other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
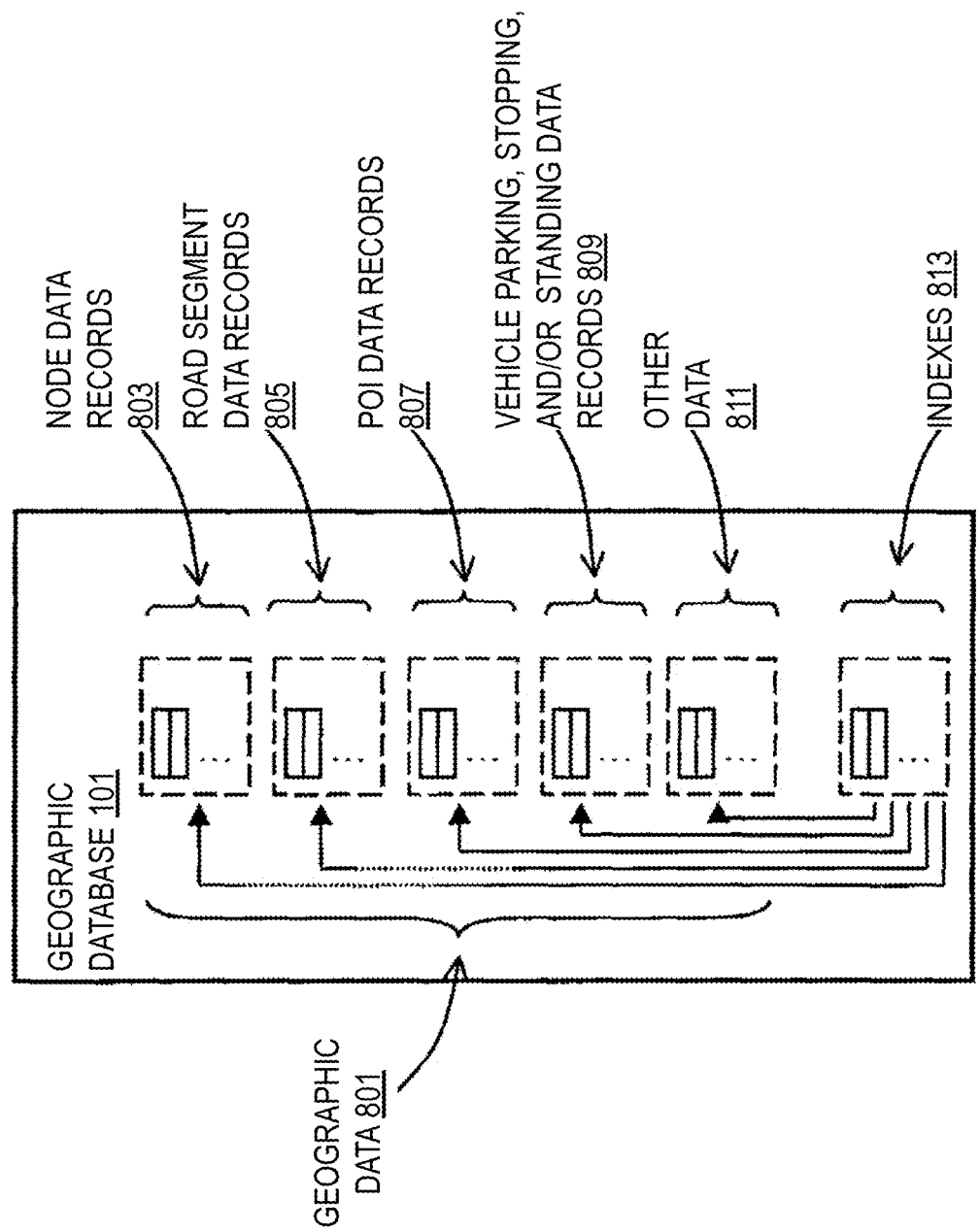
FIG. 8 is a diagram of a geographic database, according to one embodiment.

FIG. 8 is a diagram of the geographic database 101, according to one embodiment. In one embodiment, data on vehicle parking, stopping, and/or standing locations and/or any other information used or generated by the system 100 can be stored, associated with, and/or linked to the geographic database 101 or data thereof. In one embodiment, the geographic or map database 101 includes geographic data 801 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 101 includes node data records 803, road segment or link data records 805, POI data records 807, vehicle parking/stopping/standing data records 809, other data records 811, and indexes 813, for example. More, fewer or different data records can be provided.

In one embodiment, these records store one or more of the classification features used for building a parking occupancy model according to the various embodiments described herein. As described above, the features include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 811 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 813 may improve the speed of data retrieval operations in the geographic database 101. In one embodiment, the indexes 813 may be used to quickly locate data without having to search every row in the geographic database 101 every time it is accessed.

In exemplary embodiments, the road segment data records 805 are links or segments representing roads, streets, or paths, as can be used in the calculated route or recorded route information. The node data records 803 are end points corresponding to the respective links or segments of the road segment data records 805. The road link data records 805 and the node data records 803 represent a road network, such as used by vehicles, cars, and/or other entities. Alternatively, the geographic database 101 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 101 can include data about the POIs and their respective locations in the POI data records 807. The geographic database 101 can also include data about places, such as cities, towns, or other communities, and other geographic features, such as bodies of water, mountain ranges, etc. Such place or feature data can be part of the POI data 807 or can be associated with POIs or POI data records 807 (such as a data point used for displaying or representing a position of a city).

In one embodiment, the vehicle parking/stopping/standing data records 809 can include any data item generated or used by the mapping platform 111 including, but not limited parking/stopping/standing locations, related flags, vehicle behaviors and/or feature detected from probe data, probe data, and/or the like.

The geographic database 101 can be maintained by the content provider in association with the services platform 11 (e.g., a map developer). The map developer can collect geographic data 801 to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database 101 or data 801 in the master geographic database 101 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 107 and/or UE 117).

For example, geographic data 801 or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a vehicle 107 and/or UE 117 (e.g., via a navigation application 119), for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 101 can be a master geographic database, but in alternate embodiments, the geographic database 101 can represent a compiled navigation database that can be used in or with end user devices (e.g., the vehicles 107 and/or UEs 117) to provide navigation-related functions including estimations of parking availability and waiting times to park in various parking areas. For example, the geographic database 101 can be used with the end user device (e.g., vehicle 107 and/or UE 117) to provide an end user with navigation features. In such a case, the geographic database 101 and/or its related parking data/information can be downloaded or stored on the end user device, or the end user device can access the geographic database 101 through a wireless or wired connection (such as via a server and/or the communication network 121), for example.

The processes described herein for automatically detecting a vehicle parking, stopping, and/or standing location may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
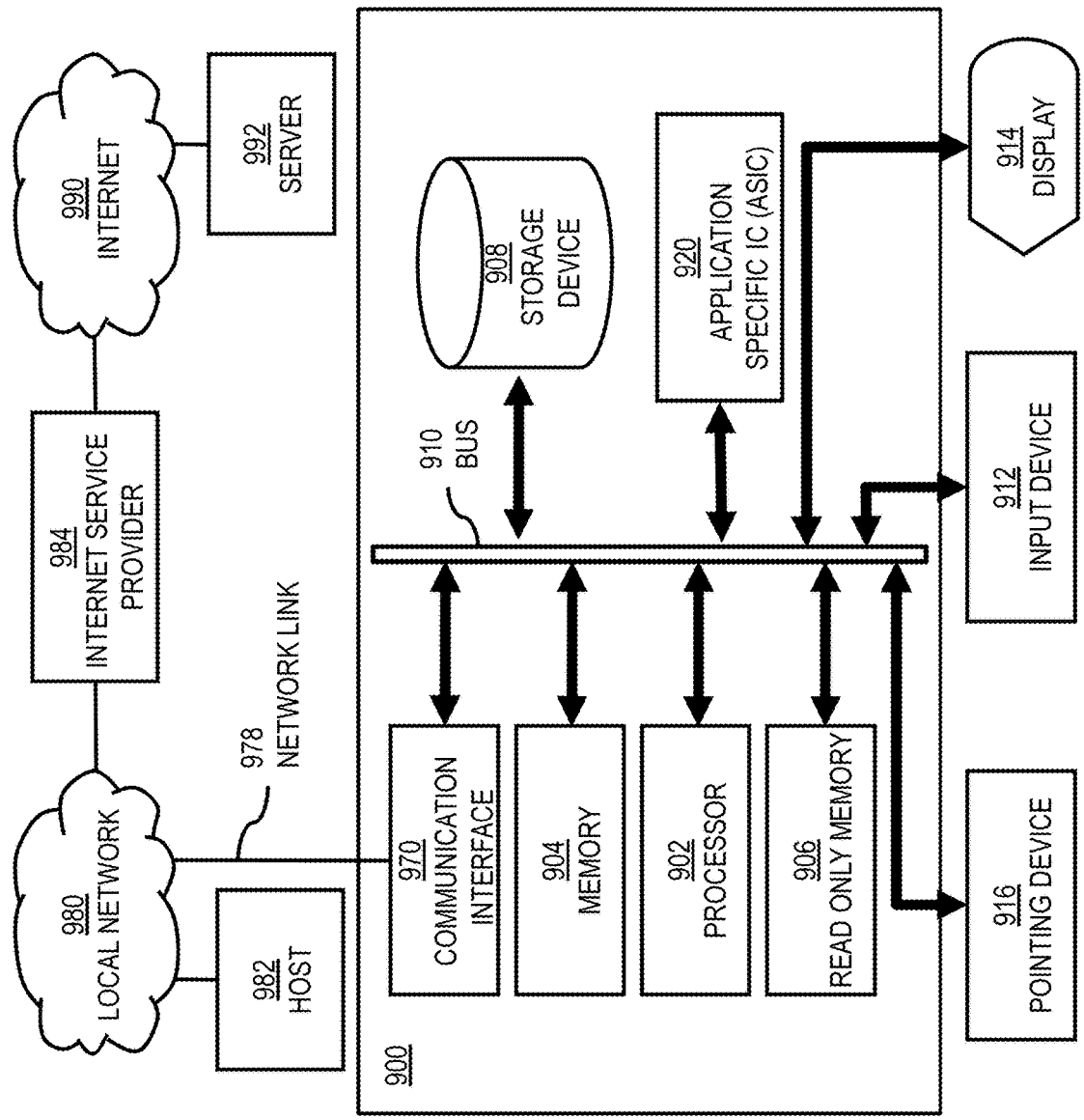
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to automatically detect a vehicle parking, stopping, and/or standing location as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to automatically detecting a vehicle parking, stopping, and/or standing location. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for automatically detecting a vehicle parking, stopping, and/or standing location. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for automatically detecting a vehicle parking, stopping, and/or standing location, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 121 for automatically detecting a vehicle parking, stopping, and/or standing location.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to automatically detect a vehicle parking, stopping, and/or standing location as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to automatically detect a vehicle parking, stopping, and/or standing location. The memory 1005 also stores the data associated with or generated by the execution of the inventive steps.

Figure 11:
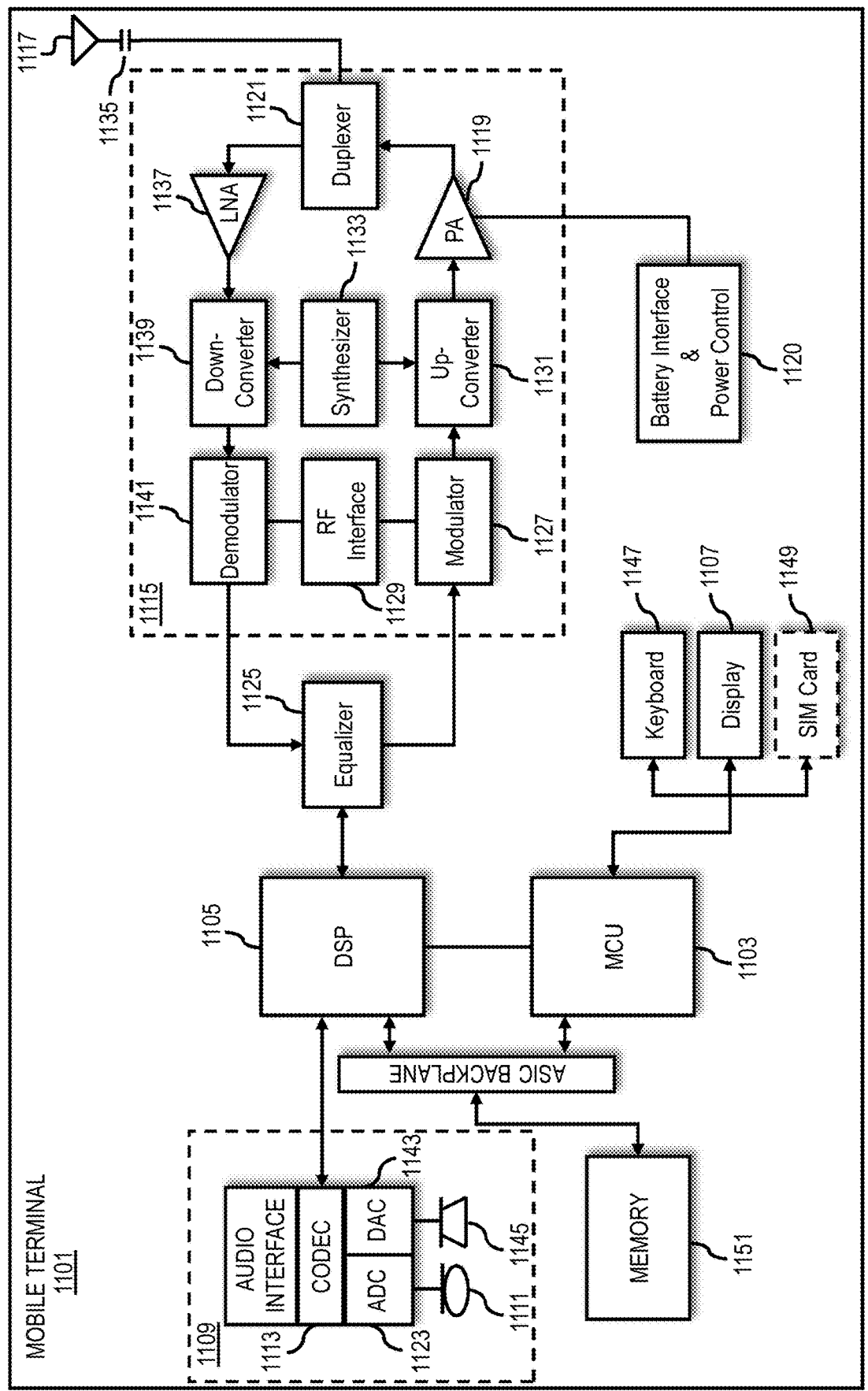
FIG. 11 is a diagram of a mobile terminal (e.g., user equipment device) that can be used to implement an embodiment.

FIG. 11 is a diagram of exemplary components of a mobile terminal (e.g., UE 117, vehicle 107 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to automatically detect a vehicle parking, stopping, and/or standing location. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    collecting, by a processor, probe data transmitted from a plurality of vehicles traveling on a road segment;
    processing, by the processor, the probe data to determine a vehicle behavior indicating a vehicle parking location, a vehicle stopping location, a vehicle standing location, or a combination thereof;
    flagging, by the processor, the road segment as being associated with the vehicle parking location, the vehicle stopping location, the vehicle standing location, or a combination thereof based on the vehicle behavior; and
    updating, by the processor, a geographic database to indicate the vehicle parking location, the vehicle stopping location, the vehicle standing location, or a combination thereof based on the flagging.

2. The method of claim 1, wherein the vehicle parking location, the vehicle stopping location, the vehicle standing location, or a combination thereof includes a parking lot, a loading zone, an alley, a standing zone, or a combination thereof.

3. The method of claim 1, wherein the vehicle behavior includes a vehicle standing or moving below a threshold speed while continuing to transmit or to generate the probe data.

4. The method of claim 1, wherein the vehicle behavior includes a reoccurrence of a vehicle on the road segment.

5. The method of claim 1, further comprising:
    processing, by the processor, the probe data to determine a speed distribution profile of the plurality of vehicles while traveling on the road segment,
    wherein the vehicle behavior is further based on the speed distribution profile.

6. The method of claim 5, wherein the speed distribution profile includes a percentile of the probe data above a percentile threshold that is associated with a zero speed, a speed below a speed threshold, or a combination thereof.

7. The method of claim 1, wherein the processing of the probe data comprises:
    extracting one or more features from the probe data,
    wherein the vehicle behavior is further based on the one or more features.

8. The method of claim 7, further comprising:
    processing, by the processor, the one or more features using a machine learning model to determine the vehicle behavior.

9. The method of claim 7, further comprising:
    comparing, by the processor, the one or more features to respective feature threshold values to determine vehicle behavior.

10. The method of claim 7, wherein the one or more features include a probe speed, a probe speed ratio, a reoccurrence of a probe identifier in the probe data over the period of time, a vehicle count, a roadway shape of the road segment, a feature location label, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
        collect probe data transmitted from a plurality of vehicles traveling on a road segment, wherein the probe data is collected;
        process the probe data to determine a vehicle behavior indicating a vehicle parking location, a vehicle stopping location, a vehicle standing location, or a combination thereof;
        flag the road segment as being associated with the vehicle parking location, the vehicle stopping location, the vehicle standing location, or a combination thereof based on the vehicle behavior; and update a geographic database to indicate the vehicle parking location, the vehicle stopping location, the vehicle standing location, or a combination thereof based on the flagging.

12. The apparatus of claim 11, wherein the vehicle parking location, the vehicle stopping location, the vehicle standing location, or a combination thereof includes a parking lot, a loading zone, an alley, a standing zone, or a combination thereof.

13. The apparatus of claim 11, wherein the vehicle behavior includes a vehicle standing or moving below a threshold speed while continuing to transmit or to generate the probe data.

14. The apparatus of claim 11, wherein the vehicle behavior includes a reoccurrence of a vehicle on the road segment.

15. The apparatus of claim 11, wherein the apparatus is further caused to:
process the probe data to determine a speed distribution profile of the plurality of vehicles while traveling on the road segment,
wherein the vehicle behavior is further based on the speed distribution profile.

16. A non-transitory computer-readable storage medium carrying one or more sequences of one or more instructions which, when executed by one or more processors, cause an apparatus to at least perform the following steps:
collecting probe data transmitted from a plurality of vehicles traveling on a road segment;
processing the probe data to determine a vehicle behavior indicating a vehicle parking location, a vehicle stopping location, a vehicle standing location, or a combination thereof;
flagging the road segment as being associated with the vehicle parking location, the vehicle stopping location, the vehicle standing location, or a combination thereof based on the vehicle behavior; and
updating a geographic database to indicate the vehicle parking location, the vehicle stopping location, the vehicle standing location, or a combination thereof based on the flagging.

17. The non-transitory computer-readable storage medium of claim 16, wherein the vehicle parking location, the vehicle stopping location, the vehicle standing location, or a combination thereof includes a parking lot, a loading zone, an alley, a standing zone, or a combination thereof.

18. The non-transitory computer-readable storage medium of claim 16, wherein the vehicle behavior includes a vehicle standing or moving below a threshold speed while continuing to transmit or to generate the probe data.

19. The non-transitory computer-readable storage medium of claim 16, wherein the vehicle behavior includes a reoccurrence of a vehicle on the road segment.

20. The non-transitory computer-readable storage medium of claim 16, wherein the apparatus is caused to further perform:
processing the probe data to determine a speed distribution profile of the plurality of vehicles while traveling on the road segment,
wherein the vehicle behavior is further based on the speed distribution profile.

* * * * *